United States Patent
Bell

(10) Patent No.: US 9,791,710 B2
(45) Date of Patent: Oct. 17, 2017

(54) DIFFRACTION GRATING FOR USE WITH A MULTI-LAYERED DISPLAY SYSTEM

(71) Applicant: PURE DEPTH LIMITED, Auckland (NZ)

(72) Inventor: Gareth P. Bell, Auckland (NZ)

(73) Assignee: PURE DEPTH LIMITED (NZ)

( * ) Notice: Subject to any disclaimer, the term of this patent is extended or adjusted under 35 U.S.C. 154(b) by 0 days.

(21) Appl. No.: 15/345,525

(22) Filed: Nov. 8, 2016

(65) Prior Publication Data
US 2017/0090210 A1    Mar. 30, 2017

Related U.S. Application Data

(63) Continuation of application No. 14/454,607, filed on Aug. 7, 2014, now Pat. No. 9,519,154.

(60) Provisional application No. 61/991,336, filed on May 9, 2014.

(51) Int. Cl.
| | | |
|---|---|---|
| G02B 27/42 | (2006.01) | |
| G02B 27/46 | (2006.01) | |
| G02B 5/30 | (2006.01) | |
| G02B 27/60 | (2006.01) | |

(52) U.S. Cl.
CPC ........... *G02B 27/4216* (2013.01); *G02B 5/30* (2013.01); *G02B 27/42* (2013.01); *G02B 27/46* (2013.01); *G02B 27/60* (2013.01)

(58) Field of Classification Search
CPC .... G02B 27/42; G02B 27/4216; G02B 27/46; G02B 27/60; G02B 5/30
USPC ........................................................ 359/566
See application file for complete search history.

(56) References Cited

U.S. PATENT DOCUMENTS

| | | | |
|---|---|---|---|
| 5,737,042 A | 4/1998 | Shinohara et al. | |
| 5,812,629 A | 9/1998 | Clauser | |
| 6,268,960 B1 * | 7/2001 | Hirota | G02B 3/0056 348/832 |
| 6,271,896 B2 | 8/2001 | Moseley | |
| 6,825,899 B2 | 11/2004 | Kobayashi | |
| 6,906,762 B1 | 6/2005 | Witehira et al. | |
| 6,914,651 B1 * | 7/2005 | Fujishiro | G02F 1/133553 349/113 |
| 7,742,239 B2 | 6/2010 | Bell et al. | |
| 8,576,141 B2 | 11/2013 | Takada et al. | |

(Continued)

FOREIGN PATENT DOCUMENTS

| | | |
|---|---|---|
| EP | 2 506 068 | 10/2012 |
| KR | 10-2011-0100538 | 9/2011 |

OTHER PUBLICATIONS

U.S. Appl. No. 14/454,607, filed Aug. 7, 2014; Bell.

(Continued)

*Primary Examiner* — William R Alexander
(74) *Attorney, Agent, or Firm* — Craig A. Baldwin

(57) ABSTRACT

A display device is described and includes a first display screen including a mask pattern of a pixel. The display device includes a second display screen including the mask pattern, wherein the second display screen is located further from a front of the display device than the first display screen, wherein the front of the display device is closest to a viewer. The display device includes a diffraction element configured to copy the mask pattern of the second display screen into one or more viewable copies in order to minimize moiré interference with the mask pattern of the first display screen.

9 Claims, 15 Drawing Sheets

(56) References Cited

U.S. PATENT DOCUMENTS

| | | |
|---|---|---|
| 8,593,562 B2 | 11/2013 | Ernst et al. |
| 9,519,154 B2 | 12/2016 | Bell |
| 2002/0126389 A1 | 9/2002 | Moseley et al. |
| 2003/0035231 A1* | 2/2003 | Epstein .................. G02B 5/021 |
| | | 359/834 |
| 2004/0032659 A1 | 2/2004 | Drinkwater |
| 2004/0155178 A1 | 8/2004 | Ito |
| 2006/0103951 A1 | 5/2006 | Bell |
| 2006/0191177 A1 | 8/2006 | Engel |
| 2006/0203338 A1 | 9/2006 | Pezzaniti |
| 2006/0290594 A1* | 12/2006 | Engel ..................... G02B 27/60 |
| | | 345/4 |
| 2008/0055193 A1* | 3/2008 | Tsuyuki ............... G02B 17/026 |
| | | 345/7 |
| 2008/0117231 A1 | 5/2008 | Kimpe |
| 2008/0316604 A1 | 12/2008 | Redert et al. |
| 2009/0079662 A1 | 3/2009 | Takada |
| 2010/0085642 A1 | 4/2010 | Drinkwater |
| 2011/0164036 A1 | 7/2011 | De Zwart |
| 2012/0140131 A1 | 6/2012 | Lanman |
| 2013/0083259 A1 | 4/2013 | Davey |
| 2013/0208198 A1* | 8/2013 | Choi ................. G02F 1/133382 |
| | | 349/15 |

OTHER PUBLICATIONS

U.S. Appl. No. 61/991,336, filed May 9, 2014; Bell.
International Search Report issued Jul. 31, 2015 for PCT/US2015/029956.

* cited by examiner

600A

600B

600C

800A

800B

800C

```
                                            800D
backPitch = 150;
nPixelsH = 10;
nPixelsV = 10;

green = zeros(backPitch);
green(5:end-5,55:95) = 1;

imshow(green);
back = repmat(green,[nPixelsV,nPixelsH]);
back(150:300,150:300) = 0;
imshow(back)

filterV = [zeros(1,backPitch)];
filterV(1:10:end) = 1;

filterV = repmat(filterV,[10,1])

back = imfilter(back,filterV);
imshow(back/max(back(:)));
figure
imshow(filterV)
surfl(abs(fft2(filterV)))
```

```
%--------------------------------
function W = Wigner(Ex)
N = length(Ex);
x = ifftshift(((0:N-1)'-N/2)*2*pi/(N-1));
X = (0:N-1)-N/2;
EX1 = ifft( (fft(Ex)*ones(1,N)).*exp( i*x*X/2 ));
EX2 = ifft( (fft(Ex)*ones(1,N)).*exp( -i*x*X/2 ));
W = (fftshift(fft(fftshift(EX1.*conj(EX2), 2), [], 2),
2));
```

FIG. 10

DIFFRACTION GRATING FOR USE WITH A MULTI-LAYERED DISPLAY SYSTEM

CROSS REFERENCE TO RELATED APPLICATIONS

This application is a continuation of application Ser. No. 14/454,607, filed Aug. 7, 2014, which claims benefit of U.S. Provisional Application Ser. No. 61/991,336 filed May 9, 2014, the entire disclosures of which are hereby incorporated herein by reference in this application.

BACKGROUND

PRIOR ART FIG. 1 shows the pixel structure of a striped liquid crystal display (LCD 100), which is well known in the art. When a first and second display layers are stacked, moiré interference is produced. The interference is caused by interactions between the color filters within the layers when projected onto the viewer's retina. For example, when green color filters overlap, light is transmitted making for a comparative bright patch. When a green filter is over say a red filter, not as much light will be transmitted making for a dark region. Since the rear and front display layers have slightly different sizes when projected onto the retina, the pixels will slowly change from being in phase to out of phase. This has the effect of producing dark and bright bands otherwise known as moiré interference.

There are several approaches to removing moiré interference in an MLD system. Most approaches rely on removing unwanted frequency components by spatial filtering. This can be accomplished with either a diffuser type system whereby an element with a refractive index of ~1.5 has random surface perturbations, or a diffraction type system. The performance of these systems in terms of visual aesthetics (e.g., how blurry the image looks; how much residual moiré is left; the effect on polarization; and cost, etc.) depend greatly on the system configuration.

Current multi-layered display (MLD) systems utilize diffusive optics to blur the rear most display layer. While commercially successful, this approach suffers from the following limitations: (a) the rear most image is inherently blurry—there is a trade-off between reducing moiré interference and the clarity of the rear most image display layer; (b) the diffusing element utilizes a specialized diffuser pattern, which is difficult to obtain; (c) the diffusing element sits between polarizers and both the film substrate and stiffener substrate must be free of any birefringence; and (d) the diffusing element requires a separate stiffener component (usually glass) which adds weight and expense to the final display system. As a result, diffusive type systems do not provide an ideal solution to reducing moiré interference in MLD systems, especially as those systems have reduced form factors.

In a diffraction type system of the prior art, to prevent interference from the color filters, several copies of an image are required, wherein the number of copies is defined as the rounded ratio of the width of the pixel to the width of the sub-pixel. However, while the diffraction grating is configured to generate copies of the image properly, moiré interference from the black matrix masking associated with electronic traces to each pixel is not alleviated.

Further, a disadvantage of the diffraction type system solution is that multiple orders are difficult to generate simultaneously, since this requires multiple periods PRIOR ART FIG. 2 shows the efficiencies of various blazed gratings for a diffraction type system implemented to reduce moiré interference. As can be seen from PRIOR ART FIG. 2, phase gratings with simple repeating structures are only efficient at producing zero and first order diffraction simultaneously. Higher orders, including second order and third order copies, are not shown to be generated simultaneously with the first order.

What is desired is an MLD system that addresses the moiré interference due to overlapping black matrix masking from multiple display layers.

BRIEF DESCRIPTION OF THE DRAWINGS

Further aspects of the present invention will become apparent from the following description which is given by way of example only and with reference to the accompanying drawings in which:

PRIOR ART

PRIOR ART

PRIOR ART

FIG. 8D shows the MATLAB code for modeling the required image filter kernel that minimizes moiré interference due to black mask regions in a MLD system, in accordance with one embodiment of the present disclosure.

FIG. 10 shows a Wigner Distribution code for modeling a candidate diffraction grating profile that is configured to minimize moiré interference due to black mask regions in MLD system, in accordance with one embodiment of the present disclosure.

SUMMARY

Figure 1:
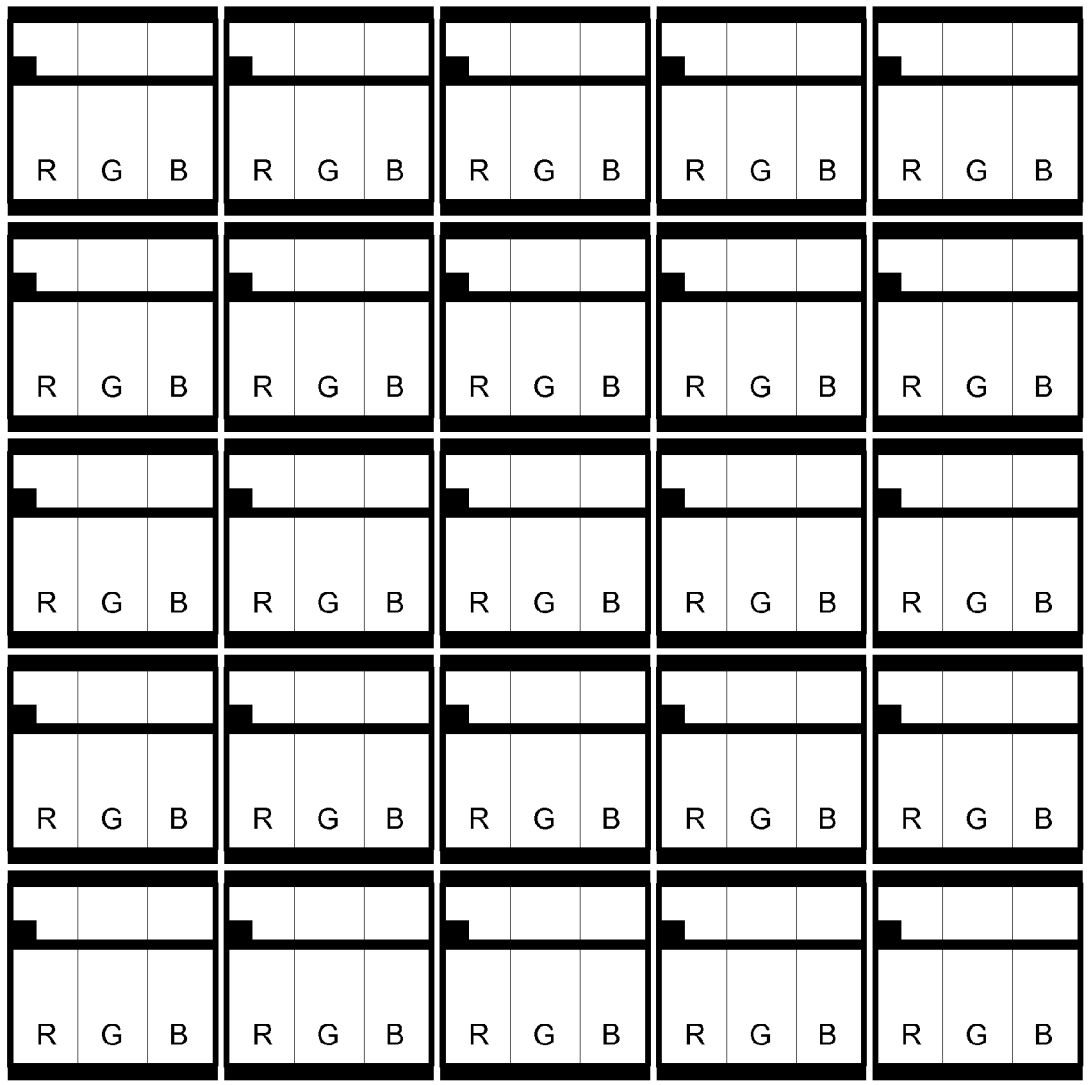
FIG. 1 shows the pixel structure of a striped LCD.
Figure 2:
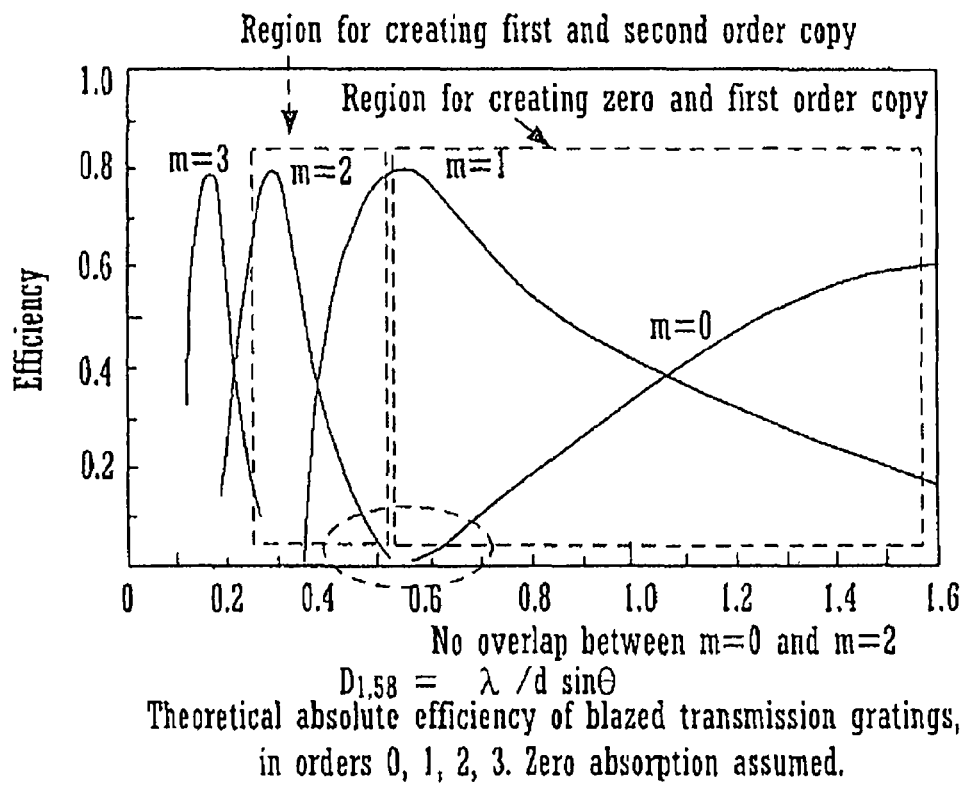
FIG. 2 shows the efficiencies of various blazed gratings.

A display device is described in one embodiment and includes a first display screen including a mask pattern, wherein the mask pattern can be reduced to a unit size that corresponds to a pixel. The display device includes a second display screen that also includes the mask pattern. The second display screen is located further from a front of the display device than the first display screen, such that the front of the display device is closest to a viewer. The display device includes a diffraction element configured to convolve the mask pattern of the second display screen into one or more viewable copies in order to minimize moiré interference with the mask pattern of the first display screen.

In another embodiment, a method for treating moiré interference in a display device is disclosed. The method includes providing a first display screen comprising a mask pattern of a pixel. The method includes providing a second display screen including the mask pattern. The second display screen is located further from a front of the display device than the first display screen, wherein the front of the display device is closest to a viewer. The method includes convolving the mask pattern of the second display screen into one or more viewable copies in order to minimize moiré interference with the mask pattern of the first display screen.

In one embodiment, preferably there would be at least two display layers. In another embodiment, preferably the diffraction grating would sit above the front most display layer so as not to impose birefringence. In still another embodiment, preferably the orders of the diffraction grating would be tuned for a red, green, and blue (RGB) color display system. In another embodiment, the diffraction grating may be integrated with a touch system. In still another embodiment, preferably the diffraction grating is a blazed grating, the angles of the grating optimized to provide the required number of orders of diffraction. In another embodiment the display layers have both a polarizer and analyzer. In still another embodiment the internal polarizer and analyzer may be removed.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Flowcharts of examples of methods for reducing moiré interference in a multi-layered display system are described, according to embodiments of the present invention. Although specific steps are disclosed in the flowcharts, such steps are exemplary. That is, embodiments of the present invention are well-suited to performing various other steps or variations of the steps recited in the flowcharts.

Accordingly, embodiments of the present invention provide for MLD systems that include a diffractive element configured to reduce moiré interference, in accordance with embodiments of the present disclosure. Specifically, the diffractive element is configured to minimize the effect of moiré interference due to the black mask patterns on overlapping display layers, and operates by convolution to generate multiple copies of the black mask pattern of a rearward display, wherein the copies each have substantially equal energy (e.g., luminance). In addition, the copies are generated and located within footprint of a corresponding pixel. It should be appreciated that when multiple copies of the mask pattern are constructed by convolution, the same number of copies of the color filter arrays are also made at the same spacing, thus concurrently removing the moiré interference pattern that would otherwise be generated by the color filters.

Figure 3:
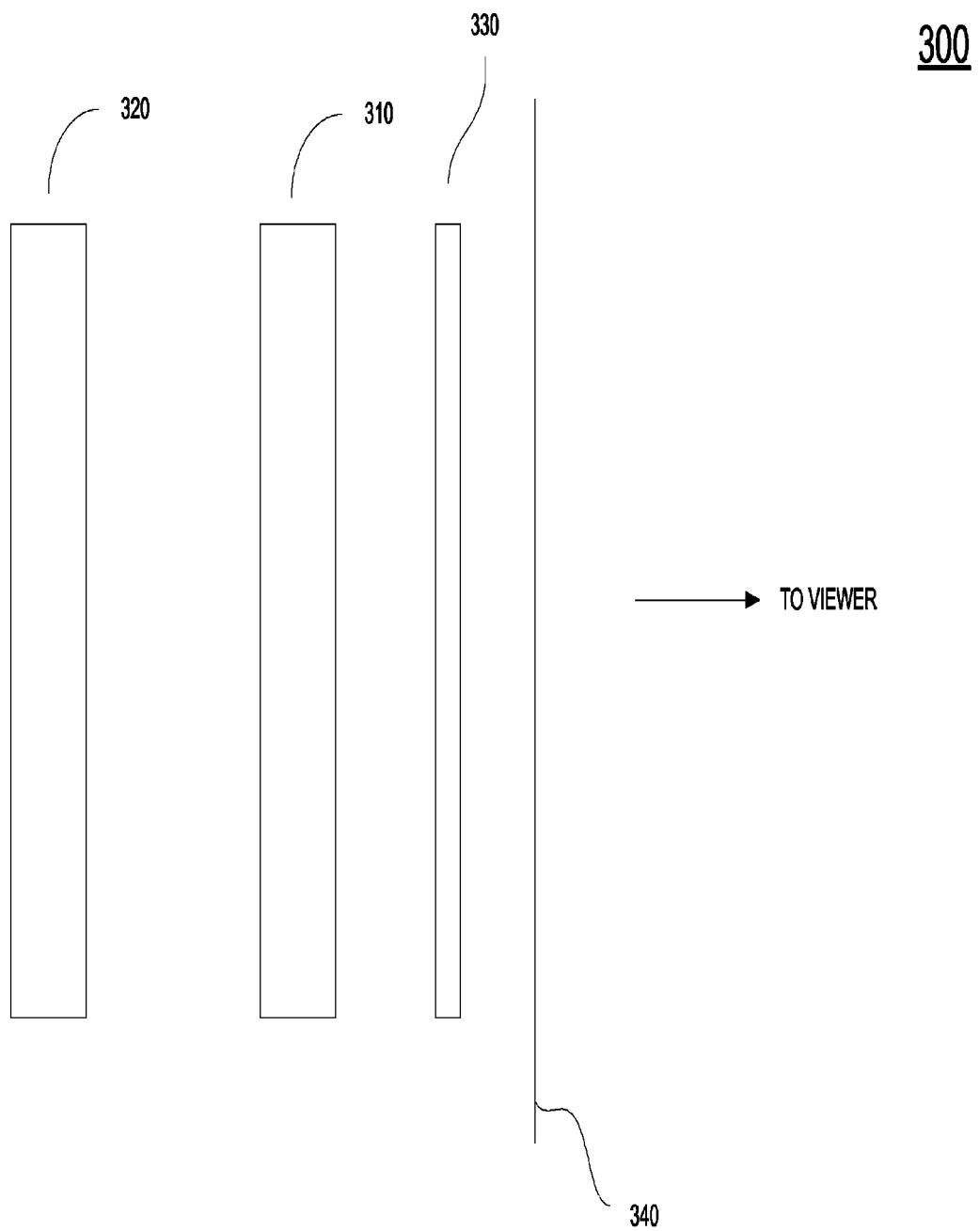
FIG. 3 is a block diagram of a multi-layered display system including a diffraction element configured to minimize the moiré interference contributions of a rearward display layer, in accordance with one embodiment of the present disclosure.

FIG. 3 is a block diagram of a multi-layered display system 300 including a diffraction element layer 330 configured to minimize the moiré interference contributions of a rearward display layer, in accordance with one embodiment of the present disclosure.

As shown in FIG. 3, the MLD system 300 includes multiple display screens, wherein each screen is selectively transparent with the ability to display images. For instance, MLD system 300 includes a first display screen 310 and a second display screen 320. The first display screen 310 is located nearer to the front 340 of the MLD system 300 than the second display screen 320. In addition, the front 340 of the MLD system 300 closest to a viewer, as is shown in FIG. 3.

For the sake of clarity and to aid understanding of the present invention, the MLD system 300 and associated display screens 310 and 320 (at least partially and selectively transparent) are shown in simplified, schematic form in the drawings, such that elements not essential to illustrate the present invention are omitted from the drawings to aid understanding. For example, the MLD system 300 may include one or more of the following items: one or more polarizers associated with one or more display screens, refractor to increase viewing angles, a rear light source (e.g., polarized backlight source), light guide, mirrors, glass substrates, etc. In one embodiment, the MLD system 300 does not include a diffuser type element.

It should be apparent to one skilled in the art that a number of alternative display technologies may be utilized in place of the LCD screens. Furthermore, although FIG. 3 shows a single screen 320 in front of the rear display layer 310, for the sake of clarity and convenience, any number of additional (at least partially transparent) imaging screens may be incorporated. Although the rear display screen 320 may also be an LCD screen, it will be apparent that alternative, non-transparent display technologies may be employed.

In particular, the first display screen 310 includes a mask pattern, or black mask pattern, that is associated with pixels in the display 310. For instance, the black mask pattern is used, for example, to hide electronic traces sending signals to the pixel components. A unit of the black mask pattern is associated with each pixel, and is further described in relation to FIG. 4. In addition, the second display screen 320 includes the same or an identical mask pattern, that is associated with pixels in the second display screen 320.

Embodiments of the present invention are configured to minimize and reduce the effect of moiré interference due to the overlapping of the black mask patterns from the first display screen 310 and the second, rear display screen 320. In particular, MLD system 300 also includes a diffraction element that is configured to convolve the mask pattern of the second display screen 320 into one or more viewable and/or virtual copies (e.g., by the viewer) in order to minimize moiré interference with the mask pattern of the first display screen 310.

In one embodiment, the diffraction element 330 is nearer to the front 340 of the MLD system 300 than the first display screen 310 and the second display screen 320. In another embodiment, the diffraction element 330 is located between the first display screen 310 and the second display screen 320. For instance, the diffraction element 330 may be located adjacent to a polarizer component.

Figure 4A:
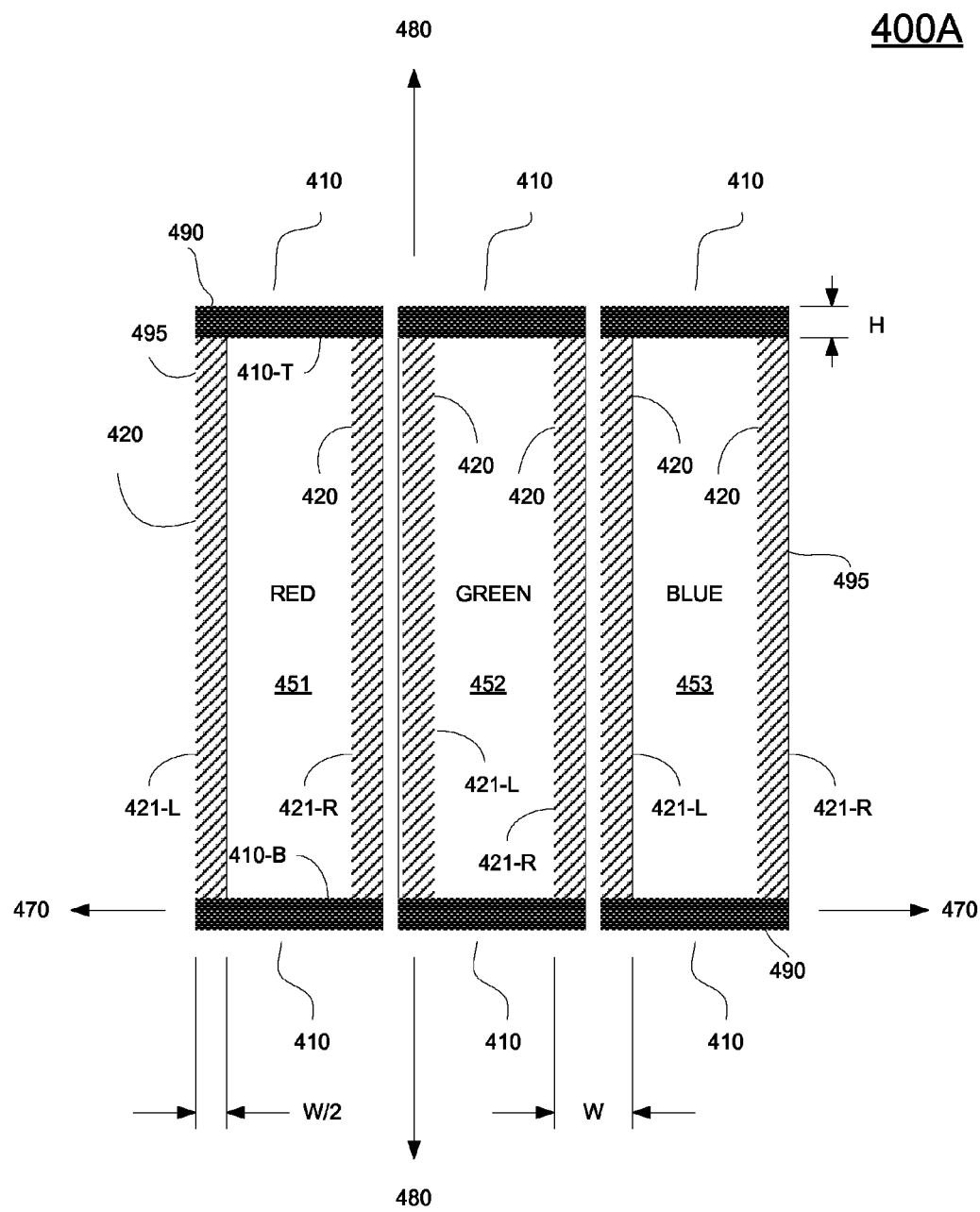
FIG. 4A is a diagram of an exemplary pixel illustrating one or more vertical portions that are repeatable in the horizontal direction, and one or more horizontal portions that are repeatable in the vertical direction, in accordance with one embodiment of the present disclosure.

For purposes of illustration, FIG. 4 is a diagram of an exemplary pixel 400 of a representative display screen (e.g., screens 310 and 320) illustrating one or more vertical portions of a black mask pattern that are repeatable in the horizontal direction 470, and one or more horizontal portions of a black mask pattern that are repeatable in the vertical direction 480, in accordance with one embodiment of the present disclosure. As shown in FIG. 4, pixel 400 includes a red filter portion 451, a green filter portion 452, and a blue filter portion 453, each of which corresponds to a sub-pixel. For instance, red filter portion 451 corresponds to the red sub-pixel, the green filter portion 452 corresponds to the green sub-pixel, and the blue sub-pixel portion 453 corresponds to the blue sub-pixel. By varying the luminance of each of the color filter portions of corresponding sub-pixels, a resulting color for the pixel is generated.

More particularly, the black mask pattern for the pixel 400 includes vertical portions 420 and the horizontal portions 410. The unit size of the black mask pattern associated with pixel 400 is repeatable for each pixel in a corresponding display screen (e.g., 310 and 320 of FIG. 3).

The black mask pattern for the pixel 400 can be further broken down into sub-pixel components. For instance, each of the sub-pixels include horizontal and vertical portions of the black mask. Taking the red sub-pixel as a representative sample, the vertical portion 420 includes a left vertical side 421-L and a right vertical side 421-R that flanks the red sub-pixel. Further, each vertical side is of width "W/2". The vertical side 421-L and/or vertical side 421-R are repeatable in the horizontal direction 470. In addition, for the red sub-pixel the horizontal portion 410 includes a bottom 410-B and a top 410-T.

The black mask pattern for the red sub-pixel is repeatable for each of the green and blue sub-pixels. For example, the horizontal portion 410 includes the top 410-T of each of the red, green, and blue sub-pixels. Though a separation or gap is shown between the vertical sides (e.g., 421-R and 421-L) of adjoining sub-pixels, this is illustrated purely for clarity. In embodiments, there is minimal or no separation between vertical sides of adjoining sub-pixels. As such, the horizontal portion 410 is one continuous sub-pattern joining the tops of the red, green, and blue sub-pixels, and joining the bottoms of the red, green, and blue sub-pixels. A height of the horizontal portion 410 of a pixel 400 is labeled "H". The horizontal portion 420 is repeatable in the vertical direction 480, and is used to determine the physical characteristics and functionality of the diffraction element used to reduce moiré interference from the horizontal portions 410 of the black mask pattern in the vertical direction 480.

Further, the vertical sides 421-R and 421-R of two adjoining sub-pixels have minimal or no separation. For example, the vertical side 421-R of the green sub-pixel is located adjacent to the vertical side 421-L of the blue sub-pixel. The resulting width of both vertical sides 421-R and 421-L of the green and blue sub-pixels, respectively, is labeled as "W". The combination of the vertical sides 421-R and 421-L is repeatable in the horizontal direction 470 and is used to determine the physical characteristics and functionality of the diffraction element used to reduce moiré interference from the vertical portions 420 of the black mask pattern in the horizontal direction 470.

In general, the diffraction element is configured to minimize moiré interference due to portions of the black mask pattern that are repeatable in various directions. Each portion corresponding to a particular direction is treated by a resulting solution/component of the diffraction element. By combining one or more resulting solutions/components, the diffraction element is able to reduce moiré interference from the black mask pattern in multiple directions.

For example, one component of a diffraction grating for use with a multi-layered display system is disclosed, wherein the diffraction grating has a number of orders in the horizontal direction that is based on dividing the pixel width by the vertical black matrix width, and wherein the orders are of substantially equal energy. Further, another component of the diffraction grating has a number of orders in the vertical direction that is based on dividing the sub-pixel height by the vertical black matrix height, wherein the orders are of substantially equal energy. In the multi-layered display system, the pixels are part of a display layer that is behind the diffraction grating with respect to the viewer.

For purposes of discussion, the horizontal direction 470 is chosen to illustrate the functionality of one component of the diffraction element. In particular, the diffraction element is configured to minimize moiré interference due to the vertical portions of the black mask pattern that is repeatable in the horizontal direction.

In general, the mask pattern includes a first portion that is repeatable in a first direction. For example, the first portion may be the vertical portion 420 that is repeatable in the horizontal direction 470. In addition, the first portion may also be the horizontal portion 410 that is repeatable in the vertical direction 480.

The diffraction element is configured to convolve the first portion of the mask pattern in the corresponding first direction. In particular, the diffraction element is configured to convolve the vertical portion 420 in the horizontal direction 470. The number of viewable copies is based on dividing a width of the pixel by a width of the first portion. In one embodiment, the width of the first portion that is repeatable in the horizontal direction is "W", and corresponds to both a right vertical side 420-R and a left vertical side 420-L associated with adjoining sub-pixels.

In one embodiment, the number of viewable copies completely covers the pixel 400 in the horizontal direction 480. That is, the spacing between the one or more viewable copies is the width of the first portion (e.g., "W"). In that manner, the diffraction element convolves the first portion of the black mask pattern to cover the pixel, at least in the horizontal direction. In one embodiment, the resulting pixel intensity after convolving using the diffraction element is reduced in proportion to the width of first portion (e.g., "W") of the black mask pattern, so that the combined color of the sub-pixels is not hidden. As such, the black mask pattern from the rear display (e.g., second display 320) is now a uniform structure, such that no repeating patterns are produced at the display level. This is accomplished without blurring out the information shown by the rear display.

In one embodiment, the number of copies comprises multiple orders beyond the variable two. For instance, the number of copies comprises four, such that that there are 8 copies (e.g., two for each order). Other embodiments are well suited to generating three orders, or orders greater than four.

Figure 4B:
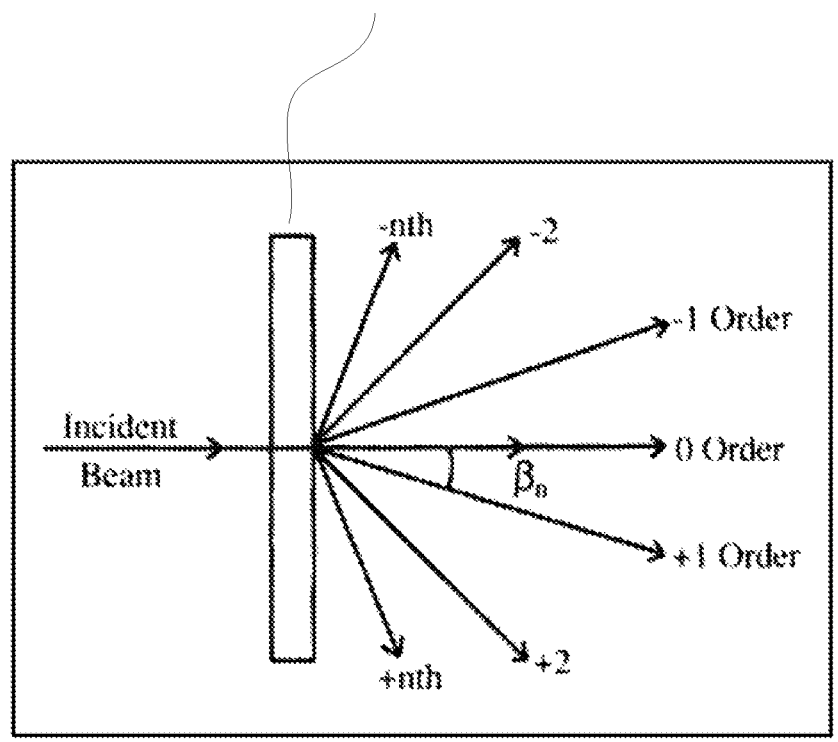
FIG. 4B is an illustration of the diffracted orders generated through a transmission grating, in accordance with one embodiment of the present disclosure.

FIG. 4B is an illustration of the diffracted orders generated through a transmission grating or diffraction element 499, in accordance with one embodiment of the present disclosure. For example, as incident light hits the diffraction element 499, orders of convolved images are created. The 0-order image is not diffracted. The first ordered image includes a positive (+1) ordered image and a negative (−1) ordered image. The second ordered image includes a positive (+2) ordered image and a negative (−2) ordered image. The same is true for each order, including the Nth order, which includes a positive (+N) ordered image and a negative (−N) ordered image.

In one embodiment, the one or more viewable copies of the first portion of the black mask pattern for the pixel 400 is generated within a footprint of the pixel, in one embodiment. That is, the copies are viewable within the footprint of the pixel, wherein the footprint is defined as the outer edges of the pixel 400, and includes the outer surface 490 (of horizontal portion 410) and the outer surface 495 (of the vertical portion 420). In another embodiment, the viewable copies are generated mostly within a footprint of the pixel.

Figure 5:
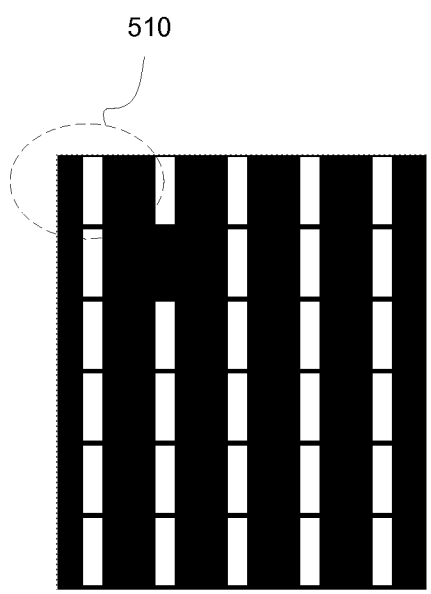
FIG. 5 is an illustration of an image of a display system with just green sub-pixels high-lighted, in accordance with one embodiment of the present disclosure.

FIG. 5 is an illustration of an image 500 of a display system with just green sub-pixels high-lighted, in accordance with one embodiment of the present disclosure. For example, in FIG. 5 image 500 is associated with a 5×6 matrix of pixels of a display screen. Outline 510 shows a red sub-pixel that is blackened (e.g., not energized), a green sub-pixel that is high-lighted as "white", and a blue sub-pixel that is blackened (or not energized). As discussed, the red sub-pixel and the blue sub-pixels are blackened out, or not considered for purposes of illustrating the reduction of moiré interference. In addition, the pixel in the second column and second row is completely blackened out, such that the green sub-pixel is also blackened. This image 500 is used to illustrate the effect of the diffraction element of embodiments of the present invention in reducing moiré interference, as compared to the diffraction type systems of the prior art, which are not effective in reducing moiré interference from the black mask pattern.

Figure 6A:
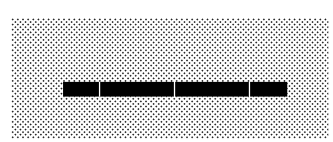
FIGS. 6A-C show a diffraction type system including a representative order-3 age kernel and the resulting moiré interference pattern due to black mask regions.
Figure 6B:
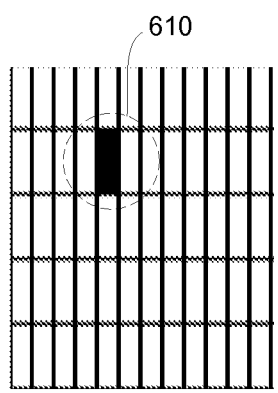
Figure 6C:
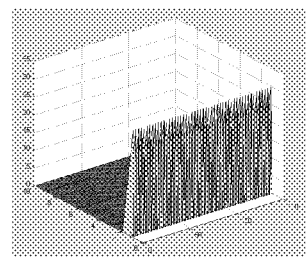

PRIOR ART FIGS. 6A-C show a diffraction type system including a representative order-3 image kernel and the resulting moiré interference pattern due to first portion (e.g., vertical portions) of the black mask regions. In particular, PRIOR ART FIG. 6A shows an order-3 image filter kernel. This image filter kernel is designed to copy larger noise components of the pixels, and more specifically to copy the sub-pixels. As such, the green sub-pixel would be copied to the left over the red sub-pixel and to the right over a green sub-pixel. These copies would be made at spacings that are the size of the sub-pixels.

PRIOR ART FIG. 6B shows undesirable black mask regions that manifest as moiré interference when viewed through other display layers (e.g., a front display screen 310). PRIOR ART FIG. 6C shows MTF (modulation transfer function) of order 3 in an image filter kernel. As shown in FIG. 6B, the effect of moiré interference is reduced, since the repeating vertical portions of adjoining sub-pixels is reduced (e.g., halved). However, the effect of moiré interference remains as evidenced by the lattice structure containing both vertical and horizontal elements. The horizontal elements exist because the component of the diffraction elements discussed only addresses the vertical portion that is repeatable in the horizontal direction.

Previous techniques (e.g., FIGS. 6A-C) include using ray tracing of light rays or virtual images of lit objects when considering the effect of some subsequent lit element. The disadvantage of this technique is that the black mask still produces moiré interference for MLD systems.

On the other hand, embodiments of the present invention provide for the reverse of the above implementation. Specifically, copies of the black mask at the spacing that is the width of the black mask for the number of copies being made is the ratio of the width of the black matrix to the width of the pixel. This means that the black mask is spread over the width of the pixel, and concurrently the sub-pixel is spread over the width of the pixel and only the width of the pixel. Thus, the system works without blurring. Previous techniques would not have considered the inverse system of embodiments of the present invention, since the situation needs to be explicitly and non reversibly inverted for the purposes of analysis—that is the sub-pixels changed from emitting colored light to black, and the black matrix changed to emitting light.

Figure 7:
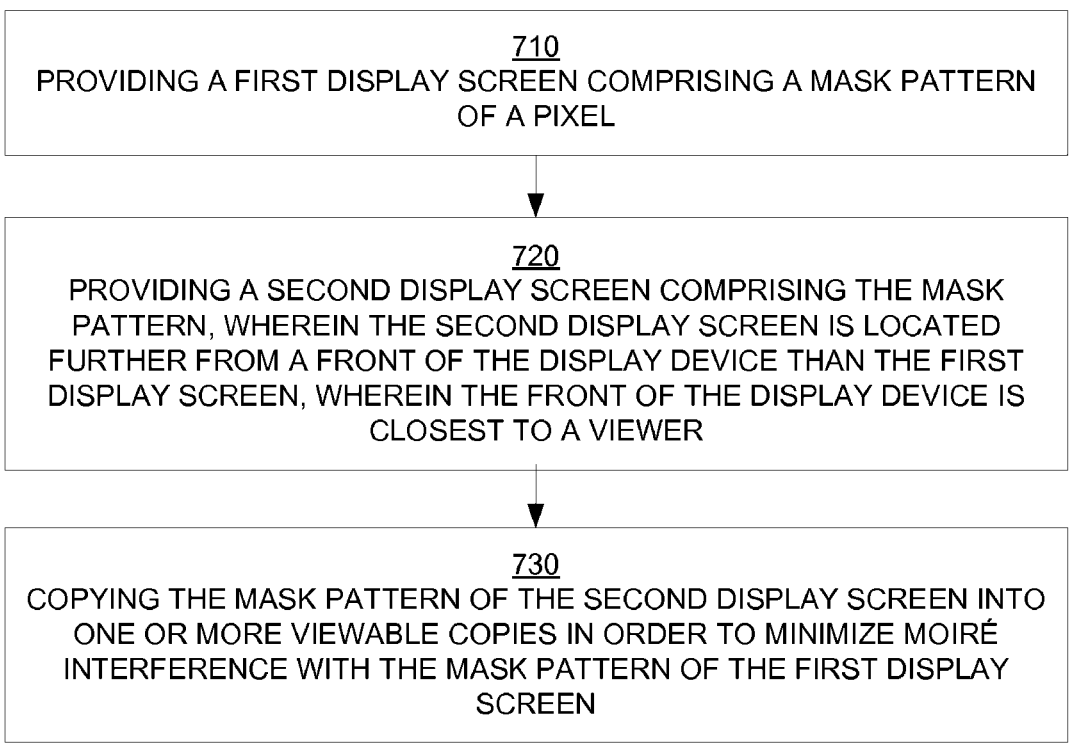
FIG. 7 is a flow diagram 700 illustrations steps in a method for minimizing moiré interference in an MLD system, in accordance with one embodiment of the present disclosure.

FIG. 7 is a flow diagram 700 illustrations steps in a method for minimizing moiré interference in an MLD system, in accordance with one embodiment of the present disclosure. In one embodiment, flow diagram is a method for manufacturing an system or MLD display device that is capable of reducing moiré interference due to contributions from the black mask pattern on overlapping display screens. Specifically, the method of flow diagram 700 is configured to generate copies of the black mask pattern in order to reduce the effect from moiré interference.

At 710 of flow diagram 700, the method includes providing a first display screen including a black mask pattern. As previously described in relation to FIG. 4, a unit of the black mask pattern is associated with each pixel. For instance, the black mask pattern is used to hide electronic tracing elements used to energize corresponding pixels of a display screen.

At 720, the method includes providing a second display screen, wherein the second display screen includes the same or an identical mask pattern. Additionally, the second display screen is located further from a front of said display device than the first display screen, and wherein the front of the display device is closest to a viewer.

At 730, the method includes convolving the mask pattern of the second display screen into one or more viewable copies in order to minimize or reduce moiré interference due to overlapping mask patterns of the first and second display screens. For instance, a first portion of the mask pattern is convolved in a first direction, wherein the first portion is repeatable in the first direction. The method further includes providing a diffraction element including a component that is configured to convolve the first portion of the black mask pattern in the first direction. It should be appreciated that when multiple copies of the mask pattern are constructed by convolution, the same number of copies of the color filter arrays are also made at the same spacing, thus concurrently removing the moiré interference pattern that would otherwise be generated by the color filters.

In a particular case, first portions of the black mask pattern are convolved in the horizontal direction, such that the number of orders associated with the copies is based on dividing the pixel width by the width of the first portion, such as the vertical portion of the black matrix pattern (e.g., "W" in FIG. 4), previously described. Further, the copies or orders are of substantially equal energy (e.g., similar luminance values).

In another case, first portions of the black mask pattern are convolved in the vertical direction, such that that the number of orders associated with the copies is based on dividing the sub-pixel height by the height (e.g., "H" in FIG. 4) of the horizontal portion of the black matrix height, wherein the orders are of substantially equal energy (e.g., similar luminance values). In one embodiment, separate components of the diffraction element generate copies in different directions (e.g., one component for the horizontal direction and another component for the vertical direction).

Figure 8A:
FIGS. 8A-C show a diffraction element that is configured to minimize the moiré interference due to the black mask regions including a representative image filter kernel, and resulting moiré interference pattern that has eliminated portions of the black mask region that is repeatable in the horizontal direction, in accordance with embodiments of the present disclosure.
Figure 8B:
Figure 8C:
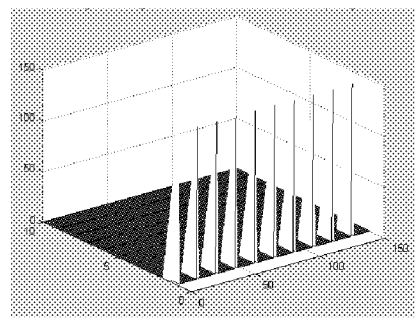

For purposes of illustration, FIGS. 8A-C show a diffraction element that is configured to minimize the moiré interference due to the black mask regions including a representative image filter kernel, and resulting moiré interference pattern that has eliminated portions of the black mask region that is repeatable in the horizontal direction, in accordance with embodiments of the present disclosure. For instance, FIGS. 8A-C illustrate the performance of a diffraction element described in relation to FIGS. 3, 4, and 7.

The system described in FIGS. 8A-C is by way of illustration only, and the convolution performed by a component of the diffraction element is only occurring in the horizontal direction. Additional convolution would need to occur in the vertical direction, by another suitable component of the diffraction element, to render the luminance profile of the display layer flat.

In particular, FIG. 8A shows an image filter kernel 800A configured to minimize the moiré interference contributions of a rearward display layer, in accordance with one embodiment of the present disclosure. That is, the image filter kernel 800A represents the functionality of a corresponding diffraction element. As shown, the image filter kernel 800A includes fifteen delta functions in a line, spaced at the width "W" of the black matrix in the horizontal direction, as previously described.

FIG. 8B shows the resulting image 800B after applying the image filter kernel 800A, in accordance with one embodiment of the present disclosure. That is, the display image 500 is convolved using the image filter kernel 800A, and produces resulting image 800B. Note that the black mask in the horizontal direction has vanished in resulting image 800B. FIG. 8C shows the resulting MTF of the diffraction grating shown as kernel 800A, in accordance with one embodiment of the present disclosure. FIG. 8D shows exemplary MATLAB code for modeling the required image kernel 800A.

In one embodiment, the diffraction element/grating (e.g., represented as image filter kernel 800A) may modulate incident light via amplitude variation, phase variation or a combination of both.

In another embodiment, the diffraction element/grating (e.g., represented as image filter kernel 800A) may be originated by normal optical means such as producing interference patterns onto photo resist, developing the photo resist to reveal the desired profile and then making a metal master from the photo-resist by depositing a metal zinc.

In still another embodiment, the diffraction element/grating (e.g., represented as image filter kernel 800A) may be originated by e-beam writing a mask whereby electrons are used to ablate a thin aluminum film on glass or other transparent substrate, and that mask is applied on top of photo resist and the resist exposed using UV or other light. Again the photo resist may be developed and a metal master may be constructed by applying a metal such as zinc.

In another embodiment, the diffraction element/grating (e.g., represented as image filter kernel 800A) may be physically realized by hot embossing, cold embossing, or UV embossing onto transparent optical substrates such as, but not limited to, Cyclo Olefin Polymer, Polyethylene, Polypropylene, Polyester, Nylon, triacetate cellulose, Poly (methyl methacrylate) and polycarbonate. The finished film may have a transparent adhesive such as 3M™ Optically Clear Adhesive 8173D applied to the back for attachment to a glass stiffener, protective layer or touch screen.

In another embodiment, conversely, if not used with a touch screen, the diffraction element/grating (e.g., in a separate layer) may point towards the viewer, where the advantage in this configuration is that it acts as an anti glare coating to prevent unwanted reflections from being noticed in addition to the diffraction effect.

In another embodiment, the diffraction film on the diffraction element may be optimized to have features pointing towards the display layer, leaving an optically smooth surface towards the viewer for the purposes of a touch screen layer. This is primarily so that the oils from the viewer's fingers in such a situation do not contaminate the diffraction layer and render it useless.

In still another embodiment, the diffraction film on the diffraction element may be placed between display layers or on top of the top most display layer. Preferably, the film would be on the top most display layer when used with LCD panels to avoid birefringence problems.

In another embodiment, the surface features of the diffraction element may be constructed by any combination of sine waves of any amplitude, frequency or phase in the horizontal and vertical directions. In one embodiment, preferably these sine waves form a series, where the wavenumber increases by some integer multiple of a base wavelength, that is expressed as Equation 1, as follows:

$$Sn=An*\sin(x*kn+chi). \quad (1)$$

In Equation 1, the term "An" is defined as the amplitude of the sine-wave, and chi is the phase. The term "kn" is defined, as follows: kn=2*pi*n*lambda, where lambda is the base wavelength, and "n" is an integer. The base wavelength depends on the distance between the diffraction film and the target image layer.

In another embodiment, there is one element in the series for each copy of the black mask required.

In still another embodiment, the diffraction element/grating may be optimized for situations where there are no color filters, such as in an transparent OLED or monochrome display.

In another embodiment, the diffraction grating may also be optimized for red green and blue stripe patterns, delta patterns, bayer patterns, phosphor dots or any other pixelated configuration where there is a black mask or shadow mask between pixels.

In one embodiment, implementation of the image kernel (e.g., kernel 800A) using a diffraction grating considers three requirements when generating a diffraction element that reduces moiré interference due to black mask patterns, in accordance with one embodiment of the present disclosure. The first requirement is the number of orders, which is determined by the ratio of the black mask width to pixel width in the horizontal and vertical directions respectively, as previously described. The second requirement is the spacing between the diffraction element and the rear pixel display. The third requirement is the wavelength(s) of light that the color filters transmit.

Figure 9:
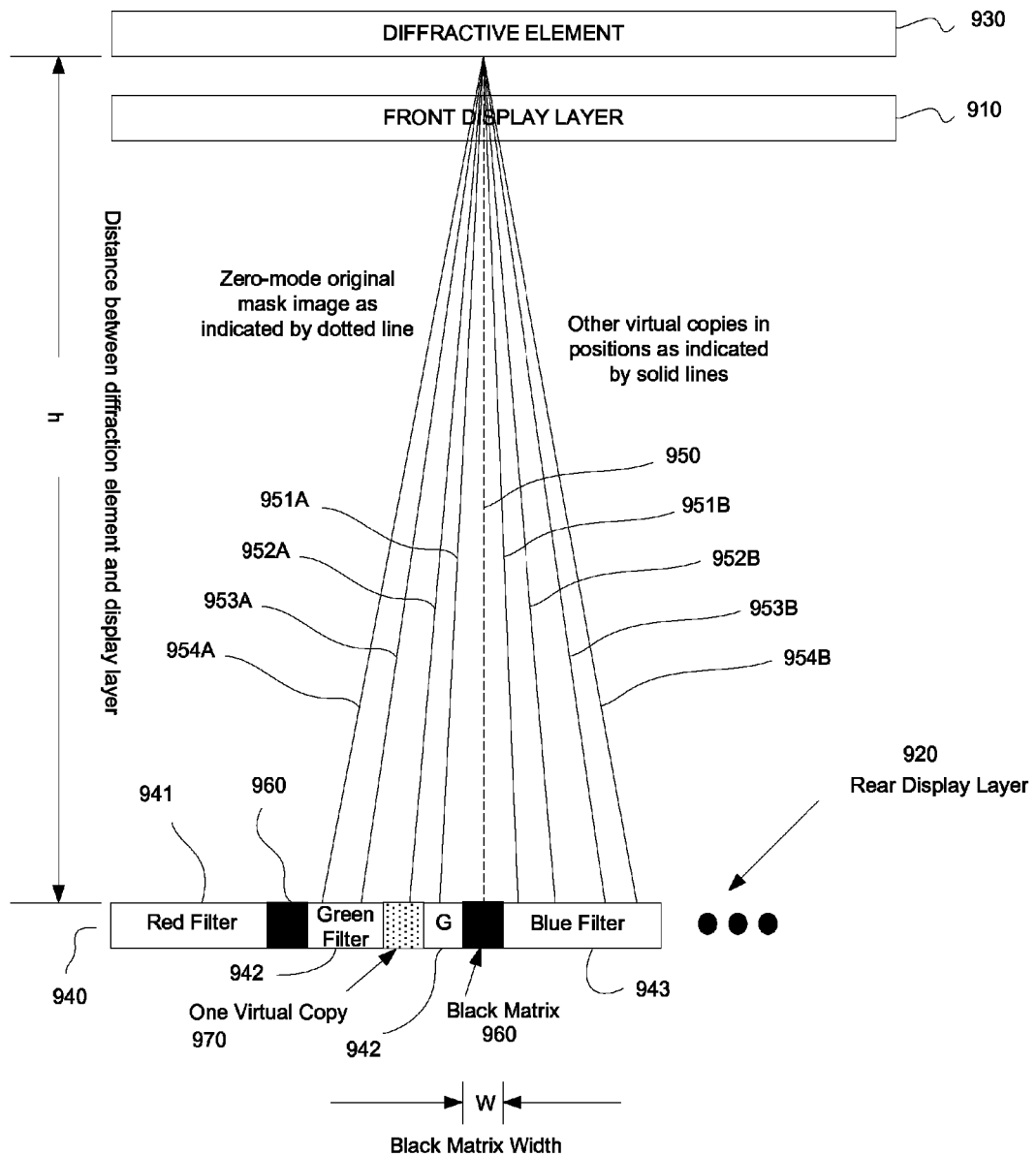
FIG. 9 shows the implementation of a representative image filter kernel on a single pixel, wherein the image filter kernel is configured to minimize moiré interference due to black mask regions in a MLD system, in accordance with one embodiment of the present disclosure.

FIG. 9 shows the implementation of a representative image filter kernel on a single pixel, wherein the image filter kernel is configured to minimize moiré interference due to black mask regions in a MLD system in consideration of the three requirements described previously, in accordance with one embodiment of the present disclosure.

The display system shows one pixel 940 on rear most layer or screen 920. The pixel includes a red filter component 941, a green filter component 942, and a blue filter component 943.

In addition, the display system includes an interfering or intervening layer, such as, the front display layer or screen 910. The front display layer 910 and the rear display layer 920 are configured to display images.

The display system includes a top most diffraction element 930 that operates on the wavelength spectra transmission of color filters. In particular, the diffraction element is configured to reduce and/or minimize moiré interference due to the black matrix patterns on overlapping display screens/layers. That is, the diffraction element 930 is configured to generate copies of the black matrix pattern, such as, copying a first portion of the mask pattern in a first direction, wherein the first portion is repeatable in the first direction.

As shown in FIG. 9, the diffractive element convolves the black matrix portion 960 of width "W" across the pixel 940. In one embodiment, the copies are confined within a footprint of pixel 940. For example, black matrix 960 is associated with a zero mode along dotted line 950. Virtual copies of the portion 960 of black matrix are generated by the diffraction element along the solid lines. For instance, first order copies are generated along lines 951A and 951B; second order copies are generated along lines 952A and 952B; third order copies are generated along lines 953A and 953B; and fourth order copies are generated along lines 954A and 954B. As an illustration, a second-order virtual copy 970 is generated along line 952A. Additional orders may be generated using a different diffraction element. Also, lesser number of orders may be generated using a different diffraction element.

The diffraction angle associated with any virtual copy is defined in Equation 2, below. In Equation 2, the variable "h" is the distance between the diffractive element 930 and the rear display layer 920. The variable "a" indicates the order of the virtual copy. For instance, for virtual copy 970, the variable "n" is the value 2.

$$\text{diffraction angle} = n\,\tan(h/W). \quad (2)$$

In one embodiment, the required diffraction element/grating may be optimized for the requirements above via the following process, described below.

The process includes an operation configured to select candidate diffraction grating profile(s) to be tested. For example this may be a combination of first, second, up to n order gratings designed for the wavelength in mind. The candidates may be generated by optimization algorithms such as genetic, simulated annealing, or levenberg-marquardt in one embodiment. The design may be optimized for a single wavelength such as 525 nm as in the green spectrum in FIGS. 8A-C, or the optimization algorithm may be modified to create an Pareto optimum for 3 or more given wavelengths.

The process includes an operation configured to create a model of the candidate grating profile. The candidate profile is modeled in a finite difference time domain simulation package (e.g., MEEP available at http://ab-initio.mit.edu/wiki/index.php/Meep). The model includes a substantially collimated incident beam, and the computational cell of interest, defined between the light source and diffraction grating, and just beyond the diffraction grating. The far field can be extrapolated using Fourier transforms.

The process includes an operation configured to create a model of the candidate grating profile to be modeled using an augmented light field approach. In one embodiment, the model uses a numerical Wigner Distribution code, such as the code contained in FIG. 10. The model generated by the Winger Distribution code 1000 minimizes moiré interference due to black mask regions in an MLD system, in accordance with one embodiment of the present disclosure. The code 1000 in FIG. 10 is available from the Camera Culture Group, Media Lab, Massachusetts Institute of Technology, and is subject to change.

The process further includes an operation configured to use the model to calculate the field density of the incident beam after passing through the diffraction grating.

The process further includes an operation configured to compare the strength of the incident beam after passing through the diffraction grating through the required angles of incidence. A good candidate would have most of its field strength at these angles and certainly would have no field strength beyond the maximum diffraction angle defined as the inverse tangent of the height divided by the pixel width. The process is further configured to assign a fitness measure to the candidate according to these criteria and proceed with algorithm to either stop or test new candidates.

Figure 11A:
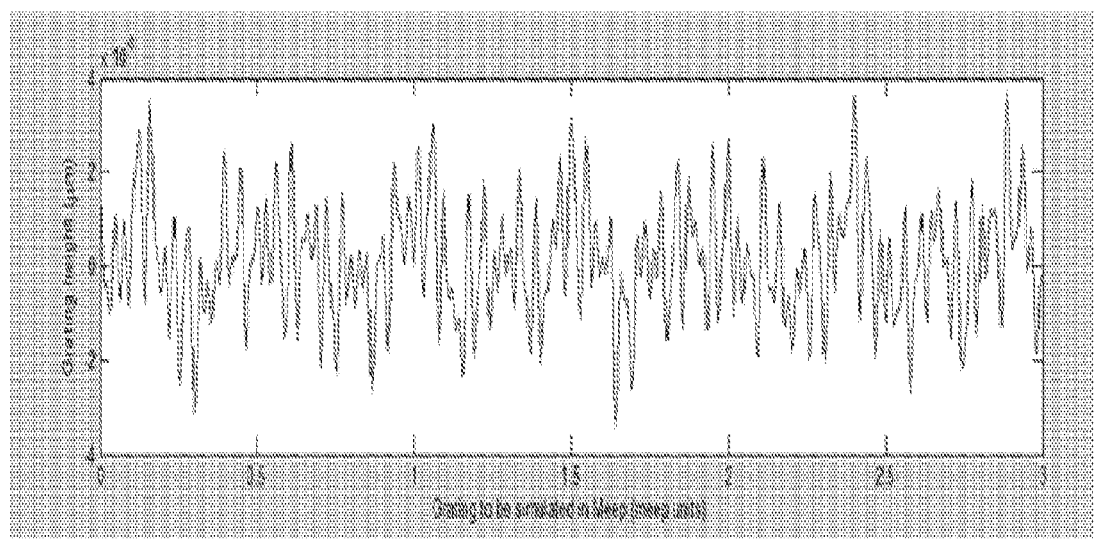
FIG. 11A-C are illustrations of a diffraction element, and various response graphs showing the reduction of moiré interference due to black regions in an MLD system, in accordance with embodiments of the present disclosure.
Figure 11B:
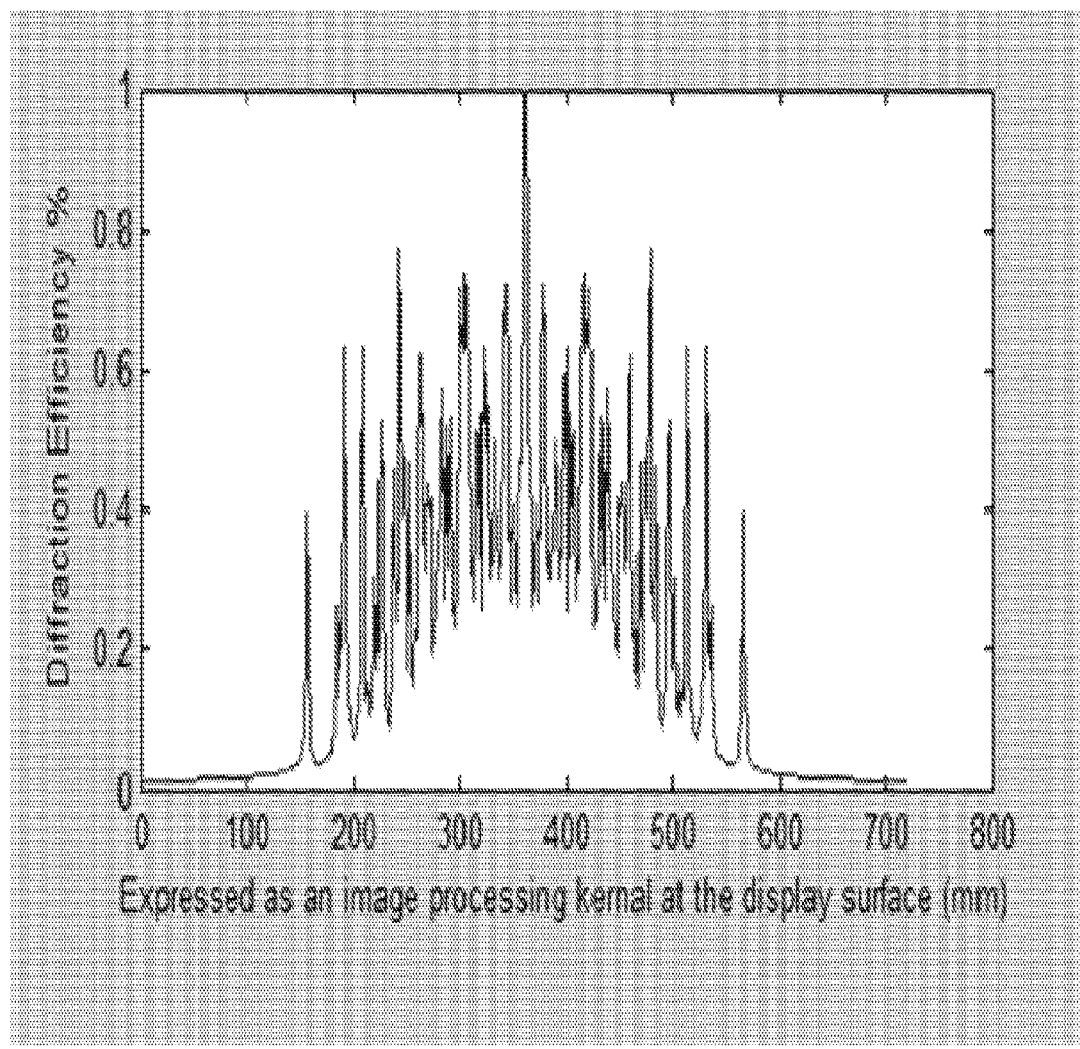
Figure 11C:
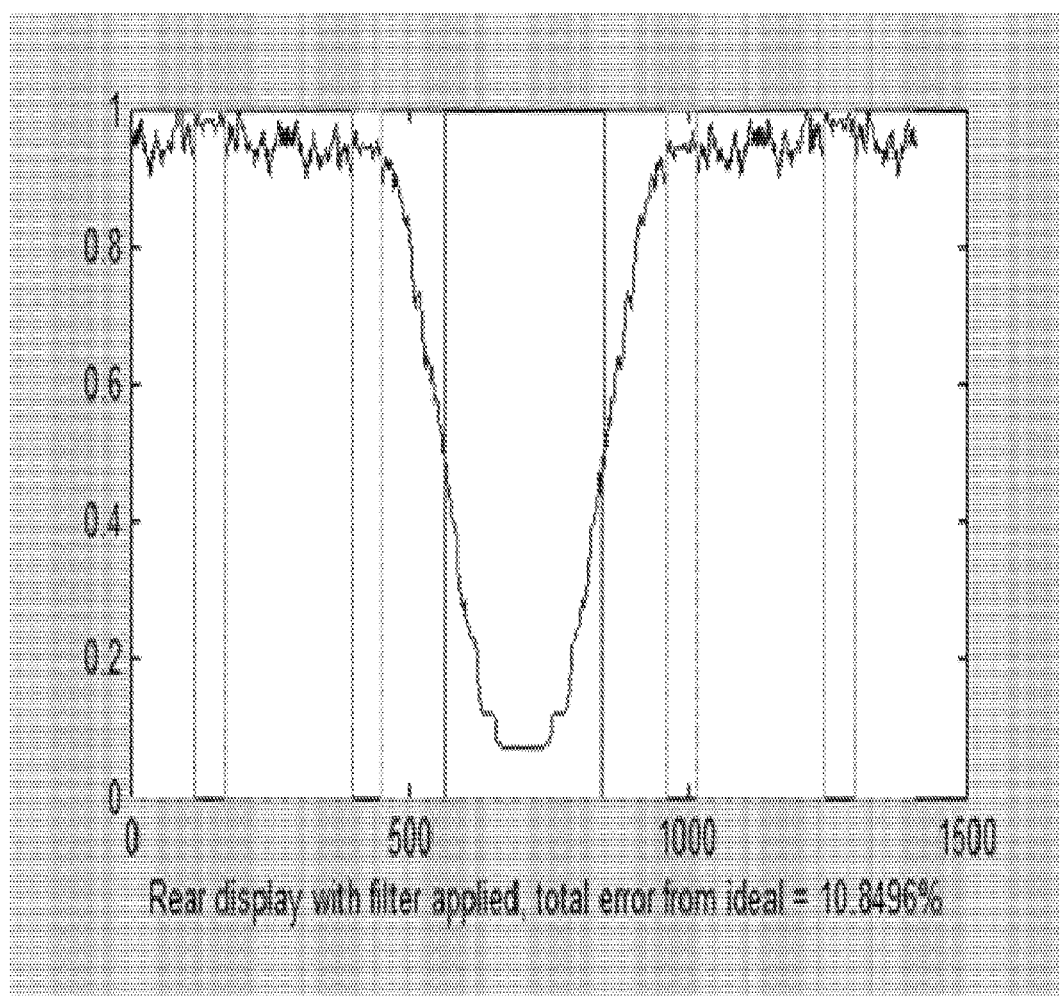

A desirable, practical one dimensional profile of a calculated configuration of a diffraction element is shown in FIGS. 11A-C. The side profile shown in FIG. 11A (where y is measured in mm with refractive index 1.55), has an angular output that has a corresponding point spread function shown in FIG. 11B, after passing through the one dimensional profile representing the diffraction grating. The effect on the one dimensional image profile is shown in FIG. 11C where the top of the image profile has been flattened, while the low point of the image profile corresponding to a dark pixel is approximately 7% of the top portion of the profile.

Thus, according to embodiments of the present disclosure, systems and methods are described providing for a diffraction grating for use with a multi-layered display system that is capable of reducing moiré interference due to black matrix patterns located on overlapping display screens.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments.

The invention claimed is:

1. A display device comprising:
   a first display screen for displaying a first image, the first display screen comprising a pixel;
   a second display screen for displaying a second image, the second display screen comprising a mask pattern and located further from a front of said display device than is said first display screen, wherein said front of said display device is configured to be closest to a viewer;
   the first and second display screens being substantially parallel to each other and overlapping each other, wherein the first and second display screens are in different planes;
   a diffraction element configured to convolve at least part of said mask pattern of said second display screen into a plurality of copies so as to reduce moiré interference with said first display screen; and
   wherein said part of said mask pattern of said second display screen is repeatable in a first direction, wherein said diffraction element is configured to copy at least said part of said mask pattern in said first direction and convolve at least said part of said mask pattern into the plurality of copies so as to reduce moiré interference with said first display screen by spreading the copies across a given pixel of the first display screen in order to cause said part of said mask pattern to substantially disappear from a point of view of a viewer.

2. The display device of claim 1, wherein the first and second display screens comprise first and second liquid crystal panels, respectively.

3. The display device of claim 1, wherein the plurality of copies are generated within a footprint of said pixel.

4. The display device of claim 3, wherein said plurality of copies within the footprint of the pixel comprises four or more copies.

5. The display device of claim 4, wherein said pixel is a subpixel.

6. The display device of claim 3, wherein said pixel is a subpixel.

7. The display device of claim 1, wherein said pixel is a subpixel.

8. The display device of claim 1, wherein said first and second display screens each comprise a plurality of pixels.

9. A method for treating moiré interference in a display device, the method comprising:
   providing a first display screen comprising a mask pattern at pixel boundaries, wherein said mask pattern is opaque;
   providing a second display screen comprising a mask pattern at pixel boundaries, wherein said second display screen is located further from a front of said display device than is said first display screen, wherein said front of said display device is to be closest to a viewer;
   convolving said mask pattern of said second display screen into a plurality of copies in order to minimize moiré interference with said mask pattern of said first display screen;
   said convolving comprising convolving a first portion of said mask pattern of the second display in a first direction, wherein said first portion is repeatable in said first direction; and
   wherein a number of said copies is based at least on dividing a width of a pixel by a width of said first portion, wherein said copies substantially cover said pixel in said first direction.

* * * * *